United States Patent [19]

Sakurai

[11] 4,088,321
[45] May 9, 1978

[54] CIRCUITRY FOR CONTROLLING LOCATION OF A RACKET IN A TELEVISION GAME APPARATUS

[75] Inventor: Hiroshi Sakurai, Funabashi, Japan

[73] Assignee: Epoch Company, Ltd., Tokyo, Japan

[21] Appl. No.: 747,341

[22] Filed: Dec. 3, 1976

[51] Int. Cl.² .......................... A63F 7/06; A63F 9/00
[52] U.S. Cl. .......................... 273/85 G; 273/DIG. 28
[58] Field of Search ................... 35/9 B, 9; 273/1 E, 273/85 R, 101.1, DIG. 28, 85 G; 340/323 R, 324 A, 324 AD, 324; 358/142, 93

[56] References Cited

U.S. PATENT DOCUMENTS

| | | | |
|---|---|---|---|
| 3,778,058 | 12/1973 | Rausch | 273/DIG. 28 X |
| 3,809,395 | 5/1974 | Allison et al. | 273/1 E |
| 3,874,669 | 4/1975 | Ariano et al. | 273/DIG. 28 X |
| 3,921,161 | 11/1975 | Baer | 273/85 R X |

OTHER PUBLICATIONS

Popular Electronics; "TV Electronic Game Projects: Pontronics;" Apr., 1976; pp. 35-41.

Primary Examiner—Richard C. Pinkham
Assistant Examiner—Vance Y. Hum
Attorney, Agent, or Firm—Staas & Halsey

[57] ABSTRACT

In a television game apparatus, a vertical control circuit responsive to a 60Hz vertical sweep voltage and a second variable voltage generates a constant width vertical racket control pulse timed with respect to each vertical sweep signal. In a normal mode, the second variable voltage is controlled by the setting of a manually adjustable potentiometer. The control circuitry is switchable to a second mode by means of a switching mechanism for disconnecting the potentiometer and connecting the circuit to a vertical control voltage derived from a ball spot generator. The second mode allows the control circuit to generate a vertical racket control pulse synchronized in vertical location with the vertical location of the generated ball spot.

6 Claims, 4 Drawing Figures

CIRCUITRY FOR CONTROLLING LOCATION OF A RACKET IN A TELEVISION GAME APPARATUS

BACKGROUND OF THE INVENTION

1. Field of the Invention

The present invention relates to control circuitry for controlling the vertical display location of a racket in a television game apparatus.

2. Description of the Prior Art

Over the past several years many television type games have been introduced in which two or more individuals may compete. In the prior art games, the generation of spots on a television type display correspond to left and right rackets and a continually moving ball in games simulating the games of tennis and PING PONG. One such prior art apparatus is shown in U.S. Pat. Re. No. 28,507, wherein circuitry is shown for remote controlling the movement of the rackets in response to manual adjustments by each player of a potentiometer for vertical control and a potentiometer for horizontal control for that player's corresponding racket. In a situation where a single player wishes to further develop skills without the benefit of a competing player, it has been necessary for the single player to simultaneously control the adjustment of the potentiometers and assume the role of both players.

SUMMARY OF THE INVENTION

The present invention overcomes the necessity in the prior art T.V. game devices of having two players participate in games simulating games such as PING PONG or tennis by providing an automatic feature wherein one racket of a plurality of rackets displayed on a T.V. receiver is automatically controlled to "hit" and return a displayed ball to the side of the television display in which a second racket is displayed and controlled by a single player. In the automatic mode, the single player may control his racket by manual control of corresponding potentiometers and play against the machine.

In the alternative, the present invention provides for two player operation by disconnecting the automatic feature and connecting potentiometers provided for manual operation by a second operator. The improved circuit for controlling the vertical location of the racket continually supplies constant width pulses each having a timed relationship with respect to corresponding ones of the vertical sync pulses generated by a vertical sweep generator.

It is an object of the present invention to provide improved circuitry for controlling the vertical location of a spot generated on a television type display in a television game apparatus.

It is another object of the present invention to provide an improved television game apparatus by including circuitry for automatically controlling the vertical location of a first spot generated on a television type display in a television game apparatus, wherein the vertical location corresponds to the vertical location of a second spot similarly generated.

DETAILED DESCRIPTION OF THE PREFERRED EMBODIMENT

Figure 1:
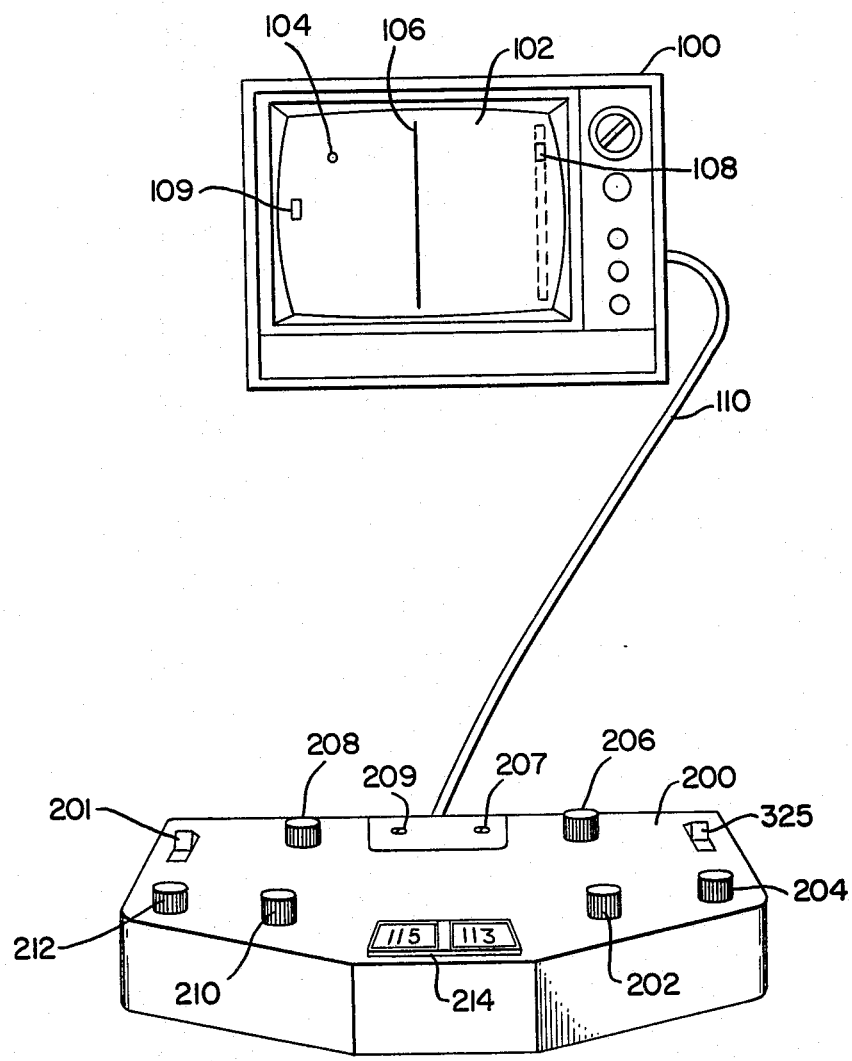
FIG. 1 is a conceptual diagram illustrating a television game control unit connected to a television receiver.

FIG. 1 illustrates a television type gaming apparatus in which a television receiver 100 is connected with a television game control unit 200 by antenna wires 110. The game control unit 200 transmits a video modulated RF signal to the television receiver 100 via the antenna wires 110. Various controls are shown on the control unit 200 for effecting remote control of a left "racket" 109 and a right "racket" 108 shown on the television screen 102. In the illustrated apparatus, the left racket 109 is controlled in its vertical position by a potentiometer adjustment 212 and is controlled in its horizontal location by potentiometer adjustment 210. 208 is a tuning adjustment and 206 is a ball speed control. Adjustments 207 and 209 are connected to horizontal and vertical sweep generators respectively and are tunable to establish synchronization with the television receiver 100. Switch 201 is an on-off power supply switch for the control unit. Potentiometer adjustments 202 and 204 are for respective horizontal and vertical location control for the right racket 108. A score board 214 is also provided on the control unit 200.

When the control unit 200 is turned on by the power supply switch 201, and the television receiver 100 is also turned on and tuned to a channel corresponding to the RF frequency transmitted by the control unit 200, the left racket 109, a continuously moving ball 104, a stable centerline 106 and a right racket 108 are displayed on the television screen 102. In this illustrative apparatus, a game simulating the games of PING PONG or tennis may be played between two players. A first player controls the movement of racket 109 by respectively adjusting the horizontal vertical potentiometers 210 and 212. Similarly, a second player opposing the first player may control the movement of the right racket 108 by respectively adjusting the horizontal and vertical potentiometers 202 and 204. In this case, the ball 104 continuously moves back and forth across the screen 102. Whenever a racket "hits" the ball 104, it is caused to reverse direction and travel to the other side of the screen.

In FIG. 1, a switch 325 having two settings is illustrated on the control console 200. A first setting of switch 325 allows for two player operation of the television game apparatus and a second setting allows for a single player "automatic" operation.

In the single player operation, the player controls, for example the left racket 109 via adjustment potentiometers 210 and 212, while the control unit 200 automatically controls the vertical location of the right racket 108 (see dotted lines in FIG. 1) so that it always "hits" the ball 104 and returns it to the left side of the screen 102. The circuitry for achieving the automatic control of the position of the right racket 108 is shown in detail in FIG. 3 and is discussed below.

Figure 2:
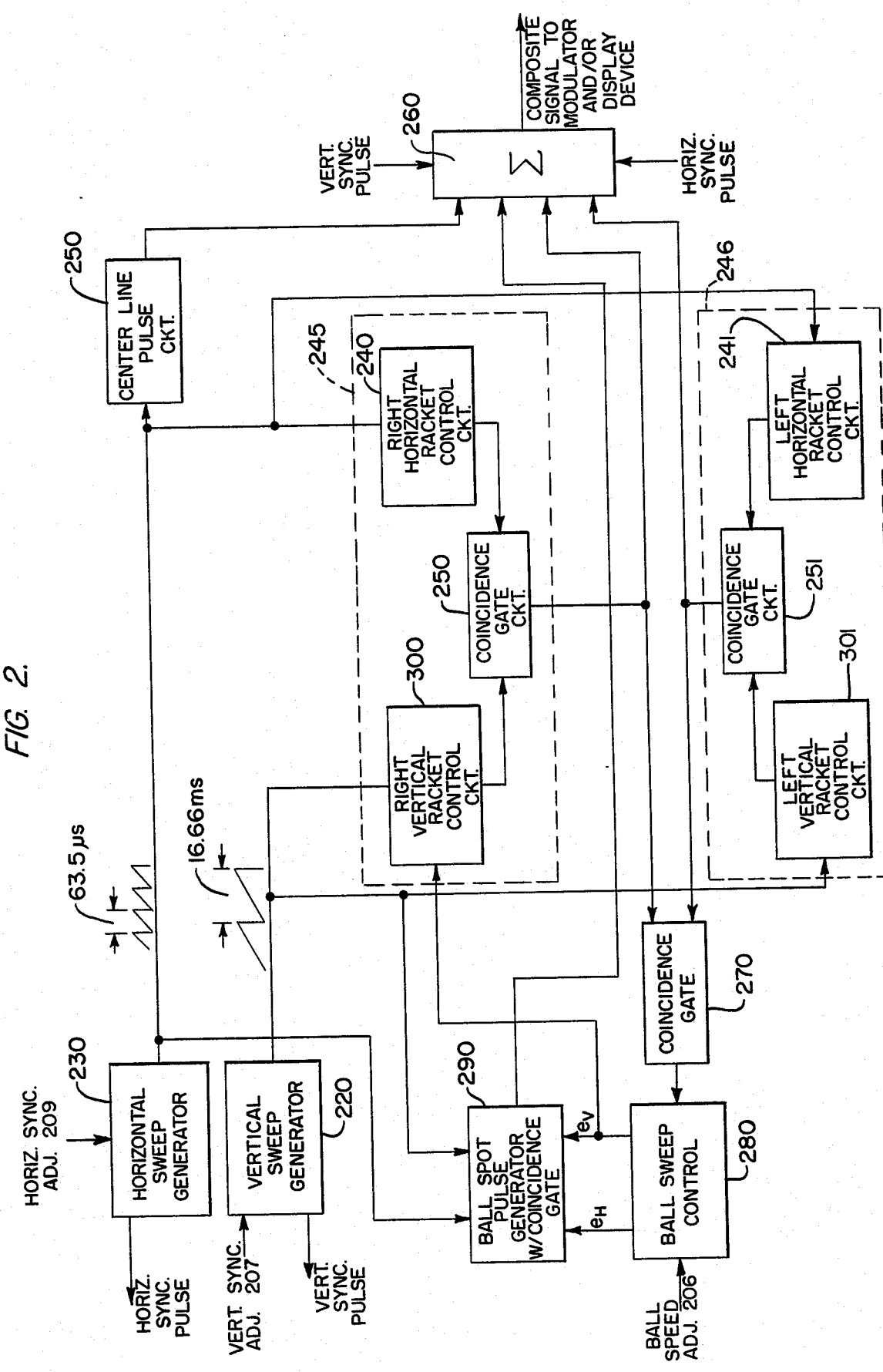
FIG. 2 is an overall block diagram of a television gaming apparatus of a type employing the present invention.

FIG. 2 illustrates an overall block diagram of a T.V. game apparatus of the type shown in FIG. 1, in which the present invention is employed. A conventional vertical synchronization sweep generator 220 generates a continuous 60Hz sawtooth wave and vertical sync pulses, which correspond to the 60 Hz vertical sweep frequency generated in the television receiver. Since slight differences may occur between the frequencies generated by the vertical synchronization sweep generator 220 and that of the television receiver, a vertical sync adjustment 207 is used to achieve precise synchronization. The output of the vertical sync sweep generator is fed to a vertical racket control circuit 300 which is an embodiment of the present invention within a right racket control circuit 245.

Figure 3:
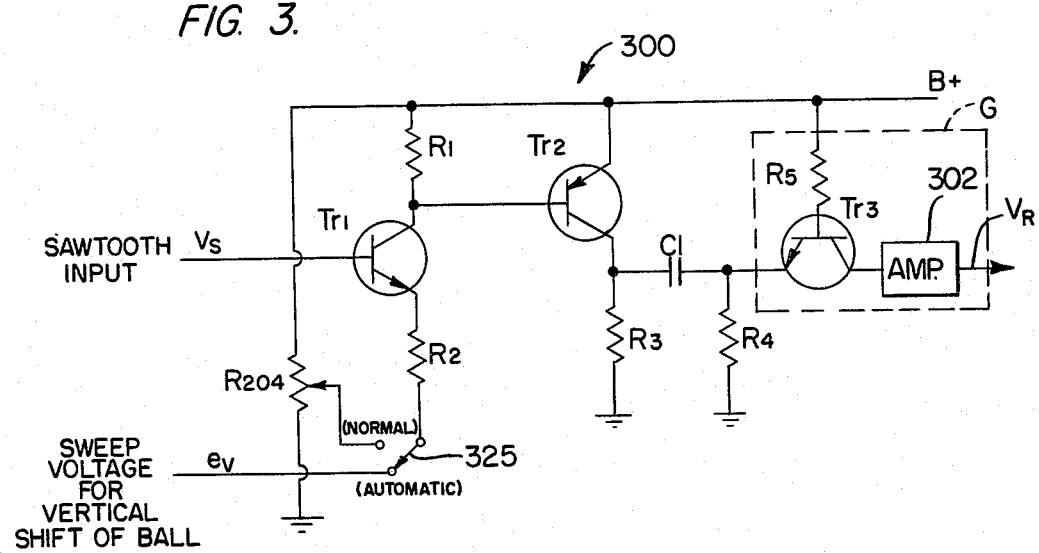
FIG. 3 is a schematic diagram of an embodiment of the present invention.

A conventional ball spot generator 290 also receives the 60 Hz sawtooth wave from the vertical synchronization sweep generator 220. A horizontal synchronization sweep generator 230 generates a sawtooth wave having a frequency of 15.75 KHz. The horizontal sawtooth wave is fed to a horizontal racket control circuit 240 of the right racket control circuit 245 and to the ball spot generator 290. The conventional ball spot generator 290 receives a continuous sweep control voltage from a conventional ball sweep control circuit 280 which is controlled by the ball speed adjustment 206 and the output from a coincidence circuit 270. The output of the coincidence circuit 270 causes the direction of the continuously moving ball spot to change whenever the ball spot location and the location of one of the rackets is in the automatic position of switch 325. Such coincidence indicates a "hit" between a racket and the ball. The ball sweep control circuit 280 generates a horizontal control voltage $e_H$ and a vertical control voltage $e_V$. The vertical control voltage $e_V$ controls the vertical location of the ball spot and is also fed to the vertical racket control circuit 300 via the switch 325 (FIGS. 1 and 3). The output from the ball spot generator 290 is fed to a summation circuit 260 wherein the horizontal sync pulses, the vertical sync pulses, and each of the signals representing the left racket, ball, center line and right racket form a composite signal which is fed to a conventional RF modulator (not shown), as they occur, for transmission to the television receiver.

It should be pointed out at this time, that the horizontal synchronization sweep generator, the vertical synchronization sweep generator, the ball spot generator, the ball sweep control and summation circuits are all conventional in this art and are illustrated to show the environment in which the present invention is utilized to achieve vertical control of a racket or other represented spot (e.g., paddle, movable goal, or a movable target) in a television gaming apparatus.

Figure 4:
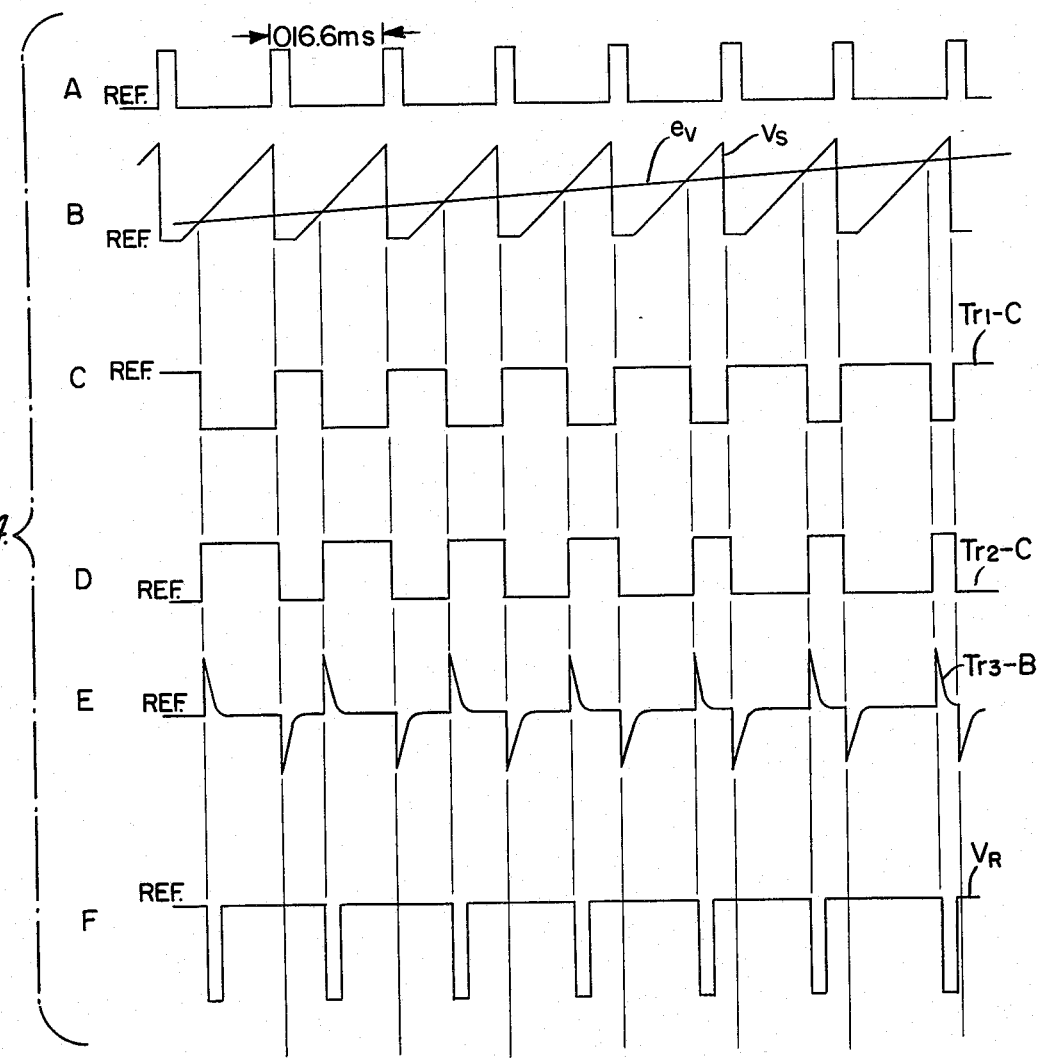
FIGS. 4A-4F illustrate various waveforms present in the circuit illustrated in FIGS. 2 and 3.

The following discussion of the vertical racket control circuit 300 is made in conjunction with FIGS. 3 and 4. The circuit 300 employs a transistor $Tr_1$ which receives the vertical sawtooth wave $V_s$, from the vertical synchronization sweep generator 220, at its base. The vertical sawtooth wave is depicted in FIG. 4B as having each cycle extending over a single vertical scan of the television display wherein approximately 250 line scans of the T.V. display occur every 1/60th of a second. The individual line scans are in accordance with the approximately 250 horizontal sync pulses which occur during each vertical scan period.

The transistor $Tr_1$ has a resistor $R_1$ connected in series with its collector to a B+ power supply. The emitter of $Tr_1$ is connected to a resistor $R_2$ and the other side of the resistor $R_2$ is connected to a switch 325. The switch 325 has two positions, as discussed above. A first position (normal) allows for manual control of the potentiometer adjustment 204 by an operator to control the vertical position of the right racket displayed on the television screen 102, while the second position (automatic) provides for automatic control of the vertical position of that same racket displayed on the television screen 102.

When the switch 325 is in the normal position the transistor $Tr_1$ is biased to be normally off and its threshold is controlled by the setting resistor R 204. When the vertical sawtooth voltage $V_s$ achieves a level which overcomes the threshold of the transistor $Tr_1$, the transistor $Tr_1$ turns on and the voltage at the collector falls to a low level, as illustrated in FIG. 4C.

When the transistor $Tr_1$ turns on, a normally on transistor $Tr_2$ is switched off. Transistor $Tr_1$ and transistor $Tr_2$ remain in their respective on and off states until the input voltage $V_s$ to transistor $Tr_1$ returns to below the threshold and the resistor $Tr_1$ returns to its normally off state. Whenever the sawtooth wave $V_s$ returns to the reference level, the transistor $Tr_1$ turns off and remains until the voltage $V_s$ again rises above the threshold determined by the setting of the resistor R 204. Therefore, the collector waveform output of the transistor $Tr_1$ and the collector waveform output of the transistor $Tr_2$ form opposite polarity binary level pulses which have their leading edge location controlled by the setting of resistor R 204 during each period of vertical scan.

The output of the transistor $Tr_2$ is fed from the collector thereof and is differentiated by a differentiation circuit which includes a capacitor $C_1$ and a resistor $R_4$. The differentiation circuit differentiates the sharply rising edge of the pulses from the collector of $Tr_2$ into positive going spikes with an RC controlled decay trailing edge. Similarly, the differentiation circuit differentiates the sharply negative going edge of the pulses from the collector of $Tr_2$ into negative going spikes with an R-C controlled decay trailing edge.

A gating circuit G includes transistor $Tr_3$ having on and off states, determined by the value of a resistor $R_5$ and the resistor $R_4$. In this case, $Tr_3$ is in a normally on state so that it will switch to the off state in response to a positive going spike from the differentiation circuit exceeding the threshold of $Tr_3$. The transistor $Tr_3$ then returns to its normally on state when the decay level of the trailing edge of the positive going spike returns to the threshold level. The positive going portion of the differentiated square wave signal switches the transistor $Tr_3$ to the off state and causes the voltage output from the associated inverting amplifier 56 to drop to a low state. When the exponential decay of the positive going spike passes through the threshold value of the transistor $Tr_3$, it returns to its normally on state and the output of the inverting amplifier 56 rises to a high state. The output signal from the gate G is termed a fixed width vertical location signal since the width is predetermined by the time between when the positive going spike exceeds the $Tr_3$ threshold and when the decay level of the trailing edge falls below the threshold of $Tr_3$.

For a fixed setting of the resistor R 204, the fixed width vertical location signal for the right racket 108, is output from the circuit 300 in a fixed time relationship with respect to the vertical sync pulse (FIG. 4A) for each vertical scan period. As the resistor R 204 is changed, the time relationship of the fixed width vertical location signal from the circuit 300 changes with respect to the vertical sync pulses and causes the image of the right racket 108 to change its vertical location on the display 102.

An additional feature of the circuit shown in FIG. 3, is that an automatic mode is provided in which the right racket 108 vertically tracks the vertical location of the ball 104 on the display 102. This automatic mode is achieved by the switch 325 which disconnects the resistor R 204 from the emitter of $Tr_1$ and substitutes therefore the variable voltage output from the ball sweep control 280, which corresponds to the vertical control voltage $e_V$ for the ball spot generator 290. The voltage $e_V$ is input to the emitter of transistor $Tr_1$ via the switch 325 and a resistor $R_2$ to control the threshold level of the transistor $Tr_1$ in a normally off state. When the sawtooth $V_5$ voltage at the base exceeds the threshold as determined by the value of $e_V$, the transistor $Tr_1$ switches from its normally off state to an on state, thereby switching the collector from a normally high voltage level to a lower voltage level. Similarly, as described above, transistor $Tr_2$ is switched from a normally on state to an off state for the duration of the vertical scan period and a positive going spike caused by a differentiation of the leading edge of the output from the collector of the transistor $Tr_2$ causes a fixed width vertical location pulses to be generated from the gate G, including transistor $Tr_3$ and amplifier 302. As can be seen from FIG. 4B, as the voltage $e_V$ varies over several vertical scan periods, the timing of the vertical location pulse shifts with respect to the vertical sync pulse over the several scanned periods. (FIGS. 4A and 4F).

With reference again to FIG. 2, the output from the vertical racket control circuit 300 is fed to a coincidence gate circuit 250. An output signal from a horizontal racket control circuit 240, which may be similar to the vertical racket control circuit without the automatic mode, is controlled by the setting of resistor R 202 and is also fed to the coincidence gate circuit 250 in order to determine the horizontal location of the right racket 108. Each time a coincidence occurs in time between the output of the circuit 300 and the circuit 240, the coincidence gate circuit 250 generates an output pulse which is fed to the summing circuit 260. Therefore, for each line scan (approximately 250 per vertical scan period), a composite signal is output from the summing circuit 260. For many line scans, the only output from the summing circuit is a center line signal from the center line generator 250 and the horizontal sync signal from the horizontal synchronization sweep generator 230.

It is apparent that similar horizontal and vertical racket control circuits may be utilized for the left racket and that the automatic feature described above could be adapted to the left vertical racket control circuit instead of the right.

In addition, for display purposes, the automatic feature could be employed in both the left and right rackets in order to display the game when no operators are present. This feature could be employed in a coin operated device whereby the dynamic features of the game are desired to be automatically displayed.

It will be apparent that many modifications and variations may be affected without departing from the scope of the novel concept of this invention. Therefore, it is intended by the appended claims to cover all such modifications and variations which fall within the true spirit and scope of the invention.

What is claimed is:

1. In a television game apparatus including means for displaying a continuously moving spot and at least two other movable spots, means for automatically controlling the vertical and horizontal location of said continuously moving spot on said display means, wherein said continuously moving spot controlling means generates a vertical location voltage for controlling the vertical location of said continuously moving spot on said display means, means for generating a vertical sweep signal having a sawtooth configuration wherein each signal of said sawtooth signal corresponds to one vertical scan period for said scan displaying means and means for individually controlling the vertical and horizontal location of said at least two other movable spots on said display means, the improvement comprising:

means within said movable spot controlling means being simultaneously responsive to said vertical sweep signal and said continuously moving spot vertical location voltage for generating a vertical location pulse timed with respect to said vertical scan period to correspond to said vertical location of said continuously moving spot said vertical location pulse generating means including a first transistor having an emitter connected to receive said vertical location voltage and having a base connected to receive said vertical sweep signal, wherein said vertical location voltage controls the threshold and biases said first transistor in an on or off state, said first transistor switches from its biased state to an opposite state when said vertical sweep signal level exceeds said threshold, thereby switching the voltage level at the collector of said first transistor from a first to a second level.

2. An improved apparatus as in claim 1, wherein said vertical location pulse generating means further includes a differentiating circuit connected to differentiate the signal resulting from said first transistor switching from said biased state to said opposite state and being present at said collector thereof.

3. An improved apparatus as in claim 2, wherein said vertical location pulse generating means further includes a gating circuit connected to receive said differentiated signal and produce said vertical location pulse having a predetermined width each time said first transistor switches from said biased state to said opposite state during each vertical scan period.

4. In a television game apparatus including means for displaying a continuously moving spot and at least two other movable spots, means for automatically controlling the vertical and horizontal location of said continuously moving spot on said display means, wherein said continuously moving spot controlling means generates a vertical location voltage for controlling the vertical location of said continuously moving spot on said display means, means for generating a vertical sweep signal having a sawtooth configuration wherein each signal of said sawtooth signal corresponds to one vertical scan period for said scan displaying means and means for individually controlling the vertical and horizontal location of said at least two other movable spots on said display means, the improvement comprising:

means within said movable spot controlling means being simultaneously responsive to said vertical sweep signal and said continuously moving spot vertical location voltage for generating a vertical location pulse timed with respect to said vertical scan period to correspond to said vertical location of said continuously moving spot said vertical location pulse generating means including a first transistor having a base, collector and an emitter wherein said first transistor is biased in an on or off state by a control voltage applied to said emitter; switching means having two electrically settable positions connected to said emitter to select the source of said emitter control voltage; a manually controllable potentiometer electrically connected to one position of said switching means, to supply a first control voltage and said vertical location voltage connected to said second position of said switching means to supply a second control voltage, wherein said switching means is manually positioned to select one of said first and second control voltages to be supplied as said control voltage to said first transistor, whereby said selected control voltage applied to said emitter controls the threshold of said first transistor, said base of said first transistor connected to receive said vertical sweep signal, said first transistor switches from its biased state to said opposite state when said vertical sweep signal level exceeds said threshold, thereby switching the voltage level at the collector of said first transistor from a first to a second level.

5. An improved apparatus as in claim 4, wherein said vertical location pulse generating means further includes a differentiating circuit connected to differentiate the signal resulting from said first transistor switching from said biased state to said opposite state and being present at said collector thereof.

6. An improved apparatus as in claim 5, wherein said vertical location pulse generating means further includes a gating circuit connected to receive said differentiated signal and produce said vertical location pulse having a predetermined width each time said first transistor switches from said biased state to said opposite state during each vertical scan period.

* * * * *